(12) United States Patent
Tsuzura et al.

(10) Patent No.: US 6,219,225 B1
(45) Date of Patent: Apr. 17, 2001

(54) GAS INSULATED SWITCH GEAR AND METHOD FOR ASSEMBLING THEREFOR

(75) Inventors: Keiichi Tsuzura; Kazuhiko Takahashi; Junzo Kida, all of Hitachi; Minoru Yabuki, Naka-gun, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/366,322

(22) Filed: Aug. 2, 1999

(30) Foreign Application Priority Data

Aug. 3, 1998 (JP) .................................................. 10-218790

(51) Int. Cl.$^7$ ...................................................... H02B 1/20
(52) U.S. Cl. ........................ 361/612; 361/618; 361/620
(58) Field of Search ..................................... 361/601–605, 361/607, 612, 618, 620, 622–624

(56) References Cited

U.S. PATENT DOCUMENTS 5,898,565 * 4/1999 Yamauchi et al. .................... 361/612

FOREIGN PATENT DOCUMENTS

| 60-18390 | 1/1985 | (JP) . |
| 60-187217 | 9/1985 | (JP) . |
| 10-75513 | 3/1998 | (JP) . |

* cited by examiner

*Primary Examiner*—Gregory Thompson
(74) *Attorney, Agent, or Firm*—Mattingly, Stanger & Malur

(57) ABSTRACT

A gas insulated switch gear has a main bus unit, a circuit breaker unit and a line unit. The line unit has a top plate with a hole through which a potential transformer is inserted into the inside of the line unit and an adapter cover fixed to the potential transformer is connected to the top plate.

7 Claims, 5 Drawing Sheets

GAS INSULATED SWITCH GEAR AND METHOD FOR ASSEMBLING THEREFOR

BACKGROUND OF THE INVENTION

The present invention relates to a gas insulated switch gear, particularly, a gas insulated switch gear with a potential transformer suitable for improving reliability.

A gas insulated switch gear includes a combination of a plurality of components such as a breaker, disconnecting switches, grounding switches, a potential transformer, and others, and a power supply conductor for electrically connecting these components to each other in a closed enclosure charged with insulating gas.

The gas insulated switch gear is superior in size reduction, insulation performance, and safety and therefore, is widely used in electric plants such as substations. As shown in Japanese Laid-Open Patent Publications 10-75513(1998), 60-187217(1985) and 60-18390(1985), the conventional gas insulated switch gear having a potential transformer includes connection conductors, disconnectors connected to the conductors, cable sealing ends connected to the disconnectors, an arrestor, one end of which is connected to the disconnectors and the cable sealing ends; a single phase potential transformer, one terminal of which is connected between the disconnector and cable sealing end disposed in one phase of three phases.

The potential transformer is enclosed in an airtight chamber together with a plurality of other components of the line unit, and therefore, the potential transformer is exposed to air when assembled to the gas insulated switch gear. A problem of reduced the reliability is caused because water and dust are attached to the windings of the potential transformer in proportion to the exposure duration to the air.

Additionally, when current flows through a conductor mounted in the line unit, a magnetic field occurs. The induced voltage is generated at the secondary side of the potential transformer by causing the magnetic field to interlink with the core of the potential transformer. As a result, the output is distorted.

SUMMARY OF THE INVENTION

An object of the present invention is to provide a gas insulated switch gear by which it is easy to assemble the potential transformer to the line unit.

Another object of the present invention is to provide a gas insulated switch gear which reduces influence to the secondary output of the potential transformer by the magnetic field caused by the current flowing through the conductor disposed in the line unit.

Another object of the present invention is to propose a method for assembling a gas insulated switch gear in which it is easy to assemble the potential transformer to the line unit.

To accomplish these and other objects a gas insulated switch gear according to the present invention comprises:
a main bus unit;
a circuit breaker unit hermetically coupled to said main bus unit;
a line unit hermetically coupled to said circuit breaker unit and having a top plate with a hole for inserting a potential transformer, and
an adapter cover or plate mounting the potential transformer inserted into said line unit through the hole and being connected hermetically on the top plate.

The outboard width of the adapter cover is larger than the inboard width of the hole and the outboard width of the potential transformer is smaller than the inboard width of the hole.

To further accomplish objects of the invention, a gas insulated switch gear according to the present invention comprises:
a main bus unit;
a circuit breaker unit hermetically coupled to said main bus unit;
a line unit hermetically coupled to said circuit breaker unit and having a top plate with a hole for inserting a potential transformer,
an adapter cover mounting the, potential transformer inserted into said line unit through the hole and being connected hermetically on the outside of the top plate, the outboard width of said adapter cover being larger than the inboard width of the hole, and the outboard width of the potential transformer being smaller than inboard width of the hole.

To further accomplish the objects of the invention, a method of assembling a gas insulated switch gear according to the present invention comprises steps of:
connecting hermetically a main bus unit, a circuit breaker unit and a line unit;
inserting a potential transformer mounted on an adapter plate and enclosed in a transporting tank into the line unit through a hole of the top plate of the line unit;
and connecting hermetically the adapter cover or plate on the top plate.

To further accomplish the objects of the invention, a gas insulated switch gear according to the present invention comprises:
a main bus unit;
a circuit breaker unit hermetically coupled to said main bus unit; and
a line unit hermetically coupled to said circuit breaker unit, wherein the arrangement direction of a conductor for connecting a conductor joint mounted on an insulating support connected to said line unit with a cable sealing end disposed in the line unit coincides with a layer direction of the core of the potential transformer, and the winding of the potential transformer is wounded so as to be perpendicular to the core layer direction of the transformer.

To further accomplish the objects of the invention, a gas insulated switch gear according to the present invention comprises:
a main bus unit;
a circuit breaker unit hermetically coupled to said main bus unit; and
a line unit hermetically coupled to said circuit breaker unit, wherein the layer direction of the core of the transformer in the line unit coincides with the direction of the magnetic field generated by the current flowing through a main circuit which connects a conductor joint mounted on an insulating support connected to said line unit with a cable sealing end disposed in the line unit.

DETAILED DESCRIPTION OF THE PREFERRED EMBODIMENT

Figure 1:
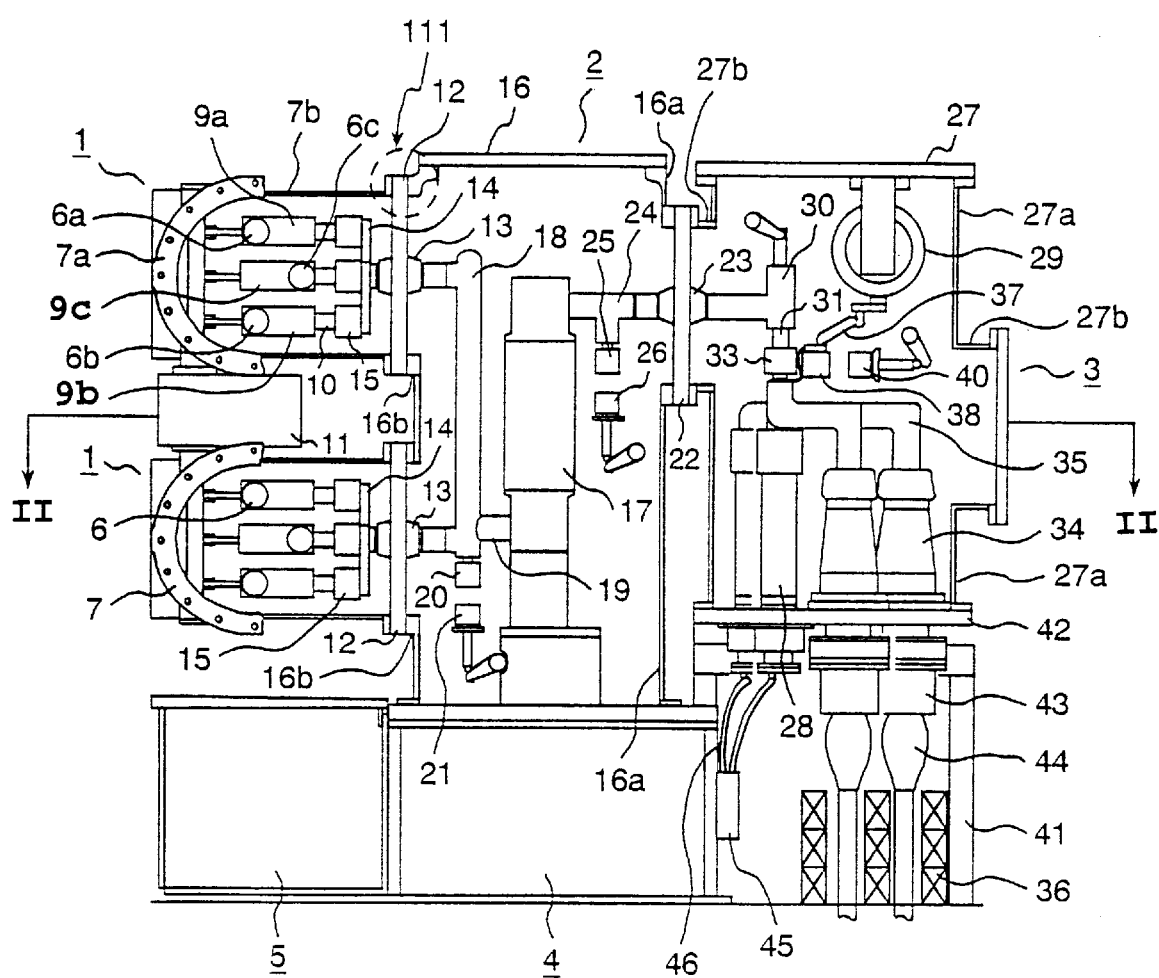
FIG. 1 is a cross sectional view showing the structure of a gas insulated switch gear of an embodiment of the present invention.
Figure 2:
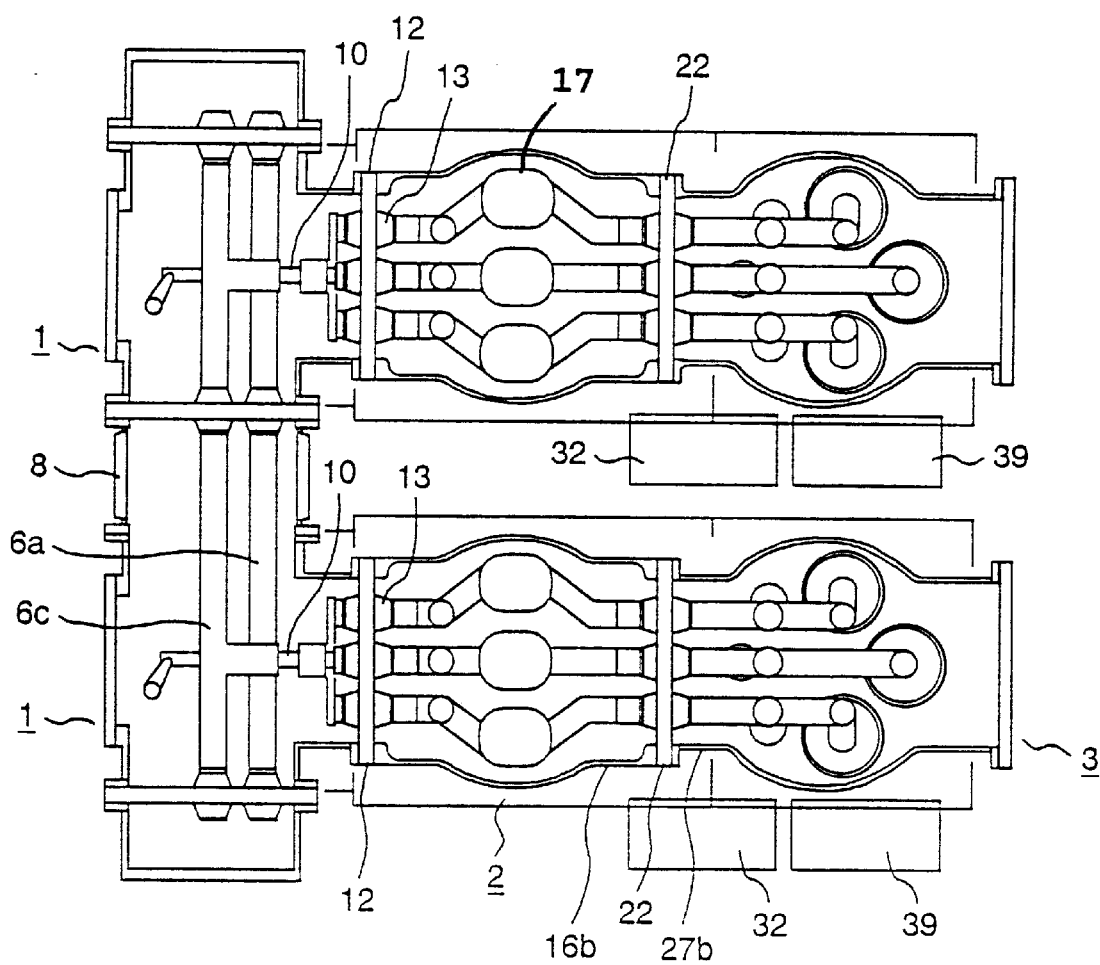
FIG. 2 is a cross sectional view along a line of II—II in FIG. 1.

The structure of a gas insulated switch gear of an embodiment of the present invention is shown in FIGS. 1 and 2. The gas insulated switch gear of this embodiment has a main bus unit 1, a circuit breaker unit 2, and a line side unit 3, and assuming the circuit breaker unit 2 has a vertical axis, two bus units 1 are connected up and down in line with each other on one side of the axis, and the line side unit 3 is connected on the other side. An operating device 4 is arranged below the circuit breaker unit 2. A control box 5 is arranged on the side of the operating device 4 on the bus unit 1 side.

The bus unit 1 houses bus conductors 6 for three phases in a batch in a bus enclosure 7 charged with insulating gas. The bus enclosure 7 is a grounded metal container, which is formed by combining a cylindrical enclosure 7a extended in the extending direction of the bus conductors 6 and a cylindrical enclosure 7b extended in the orthogonal direction to the cylindrical enclosure 7a. The bus conductors 6 are arranged so that the three conductors are located at the vertexes of an isosceles triangle respectively and it comprises bus conductors 6a and 6b arranged in a column on the center line of the cylindrical enclosure 7a and a bus conductor 6c arranged on the breaker unit 2 side of the bus conductors 6a and 6b of the cylindrical enclosure 7a. A flange is provided at both ends of the cylindrical enclosure 7a respectively and an expansion joint 8 comprising an expansion bellows is connected to the flange at one end.

A branch conductor 9a branches from the bus conductor 6a, a branch conductor 9b from the bus conductor 6b, and a branch conductor 9c from the bus conductor 6c on the breaker unit 2 side. The branch conductors 9a, 9b, and 9c are arranged in a column on the center line of the cylindrical enclosure 7b and a movable electrode 10 is provided at each center part of the branch conductors. The movable electrodes 10 are driven by operating devices 11 provided in the space between the upper bus enclosure 7 and the lower bus enclosure 7 and make a reciprocating motion in each conductor.

Each of the bus units 1 is connected to the breaker unit 2 via an insulating spacer 12. The insulating spacers 12 are used to keep air-tightness between each of the bus units 1 and the breaker unit 2. On the center line of the insulating spacers 12, conductor connections 13 to one end of which a reciprocating conductor 18 in the breaker unit 2 is connected are horizontally arranged in a line. On the other end side of each of the conductor connections 13, a fixed electrode 15 is provided via a conductor 14. Each of the fixed electrodes 15 forms a counterpart to each of the movable electrodes 10 so as to form a disconnecting switch and it is arranged opposite to each of the movable electrodes 10 so as to freely connect and disconnect to them.

The breaker unit 2 houses breakers 17 for three phases in a batch in a breaker enclosure 16. The breaker enclosure 16 is formed by combining a cylindrical enclosure 16a extended in the perpendicular direction, a cylindrical enclosure 16b extended on the side of the bus unit 1 and the line side unit 3 above the cylindrical enclosure 16a, and a cylindrical enclosure 16b extended on the side of the bus unit under the cylindrical enclosure 16a. On the center line of the cylindrical enclosure 16a, the breakers 17 are arranged in a line in the same direction as the extending direction of the bus conductors 6.

The conductor connection 13 provided in the upper insulating spacer 12 and the conductor connection 13 provided in the lower insulating spacer 12 are connected by the reciprocating conductor 18. To the lower part of the reciprocating conductor 18, a conductor 19 connected to the lower part of the breaking section of the breaker 17 is connected. At the bottom of the reciprocating conductor 18, a fixed electrode 20 is provided. The fixed electrode 20 forms a grounding device by forming a counterpart to a movable electrode 21 driven by an operation unit (not shown in the drawing) provided outside the enclosure of the breaker unit 2 and it is arranged opposite to the movable electrode 21 so as to freely connect and disconnect to them.

The breaker unit 2 and the line side unit 3 are connected to each other via an insulating spacer 22. The insulating spacer 22 is used to keep air-tightness between the breaker unit 2 and the line side unit 3. On the center line of the insulating spacer 22, a conductor connection 23 to one end of which a conductor 28 in the line side unit 3 is connected is horizontally arranged in a line. At the other end of the conductor connection 23, a connection conductor 24 connected to the upper part of the breaker 17 is connected. The connection conductor 24 has a branch section branching on the breaking section side and at its end, a fixed electrode 25 is provided. The fixed electrode 25 forms a grounding device by forming a counterpart to a movable electrode 26 driven by an operation unit (not shown in the drawing) provided outside the enclosure of the breaker unit 2 and it is arranged opposite to the movable electrode 26 so as to freely connect and disconnect to them.

The breaker positioned at the center of the breakers 17 is arranged on a straight line connecting the one positioned at the center of the conductor connections 13 provided in the insulating spacers 12 and the one positioned at the center of the conductor connections 23 provided in the insulating spacers 22. The breakers positioned on both sides of the breaker positioned at the center of the breakers 17 are arranged outside the straight line connecting the respective corresponding conductor connections 13 and 23 so as to ensure the insulation distance. Therefore, the conductors positioned on both sides of the conductor positioned at the center of the conductors 19 extend outside the reciprocating conductor 18 and they are connected to the breakers 17. The breakers 17 are formed cylindrically. However, in this case, each surface in the arrangement direction is made flat so as to reduce the size in the arrangement direction.

The line side unit 3 houses line side devices such as an arrester 28 and a potential transformer 29 in a line side enclosure 27. The line side enclosure 27 is formed by combining a cylindrical enclosure 27a extended in the perpendicular direction, a cylindrical enclosure 27b extended on the side of the breaker unit 2 above the cylindrical enclosure 27a, and a cylindrical enclosure 27b extended on the opposite side of the breaker unit 2 almost at the center of the cylindrical enclosure 27a.

At the center of a conductor 30 connected to the conductor connection 23, a movable electrode 31 is provided. The movable electrode 31 is driven by an operating device 32 provided outside the enclosure of the line side unit 3 and makes the reciprocating motion vertically in the conductor 30. In the area opposite to the movable electrode 31, a fixed electrode 33 is provided. The movable electrode 31 and the fixed electrode 33 form a disconnecting switch by making a pair.

On the lower part in the cylindrical enclosure 27a, cable sealing end 34 for three phases are arranged so as to locate at the vertexes of an isosceles triangle respectively. To a cable sealing end 34, one end of a conductor 35 is connected. To the other end of the conductor 35, the fixed electrode 33 is connected. On the side of the cable sealing end 34 on the side of the breaker unit 2, the arresters 28 for three phases are arranged so as to locate at the vertexes of an isosceles triangle respectively. The arresters 28 are also connected to the conductor 35.

The arresters 28 and the cable sealing end 34 are arranged so that the bases of the isosceles triangles formed by them respectively are opposite to each other. Furthermore, they are arranged so that the vertexes of the isosceles triangles are located almost on a concentric circle of the cylindrical enclosure 27a. By realizing this arrangement, the efficiency of the mounting operation of a current transformer 36 at the time of installation at site can be improved. By realizing this arrangement, the outer diameter of the cylindrical enclosure 27a of the line side unit 3 can be made smaller. Furthermore, by realizing this arrangement, the cable sealing ends 34 and the arresters 28 at least for two phases, moreover for the same phase can be arranged close to each other, so that the charging rate of the arresters 28 can be reduced and the life of the arresters 28 can be lengthened.

The disconnecting switches comprising a pair of the movable electrode 31 and the fixed electrode 33 are arranged in a line in the same direction as the arrangement direction of the breakers 17 at almost the same position as that of the ones for two phases at a long distance from the breaking unit 2 among the arresters 28. The potential transformer 29 is arranged above the cable sealing end 34. The potential transformer 29 can be connected to or disconnected from the conductor 35 via a separation device 37. In the conductor 35, a fixed electrode 38 different from the fixed electrode 33 is provided. The fixed electrode 38 forms a grounding device by forming a counterpart to a movable electrode 40 driven by an operation unit 39 provided outside the enclosure of the line side unit 3 and it is arranged opposite to the movable electrode 40 so as to freely connect and disconnect to them.

Under the line side unit 3, a frame 41 for mounting the line side unit 3 is provided. At the bottom of the enclosure of the line side unit 3, a base plate 42 is provided and connections 43 of the cable sealing end 34 are pulled out outside the enclosure of the line side unit 3 via the seal portion of this base plate 42. Cables 44 are connected to the connections 43. The current transformers 36 are attached to the cables 44.

On the side of the box for housing the breaker operating device 4 under the line side unit 3, a monitoring device 45 is attached. To the monitoring device 45, grounding cables 46 pulled out outside the container of the line side unit 3 from the bottom of each arrester 28 are connected. When the grounding cables 46 are pulled out from the bottoms of the arresters 28 like this, the grounding cables can be shortened, so that the potential superimposed on the operating potential of the arresters 28 is made smaller and the arresters 28 can be precisely operated at the operating potential.

Figure 3:
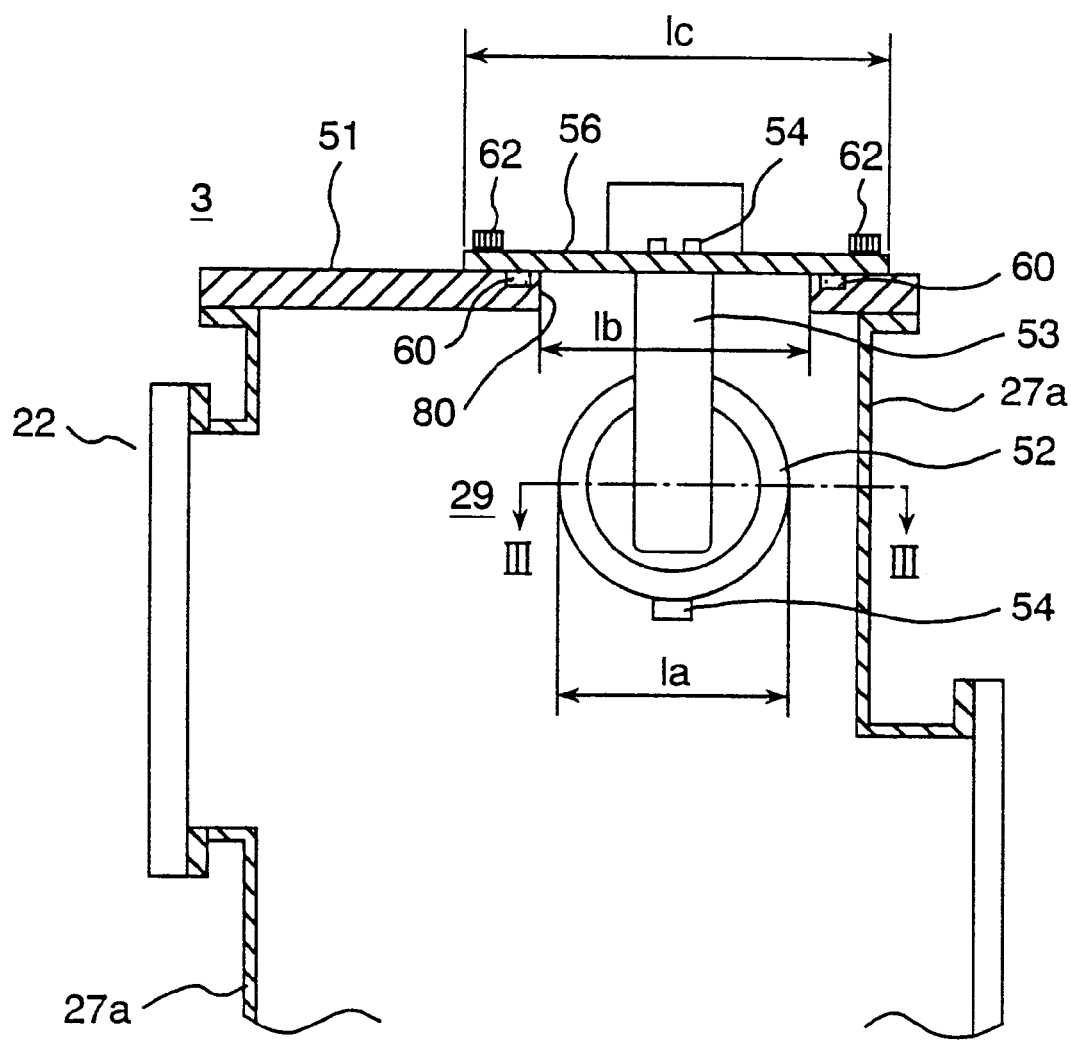
FIG. 3 is an enlarged cross sectional view of the line unit shown in FIG. 1.

The potential transformer 29 is enclosed in the line unit 3 of the gas insulated switch gear as shown in the embodiment. As shown in FIG. 3, the potential transformer 29 comprises a shield part 52 enclosing a winding, a core part 53 and terminals 54 for leading out voltage. As further shown in FIG. 3, a top plate 51 is mounted on a cylindrical enclosure part 27a and fixed to the line unit by bolts 60 by way of a flange part. The top plate 51 has a circular hole 80 through which the potential transformer 29 is inserted into the line unit 3.

Figure 6A:
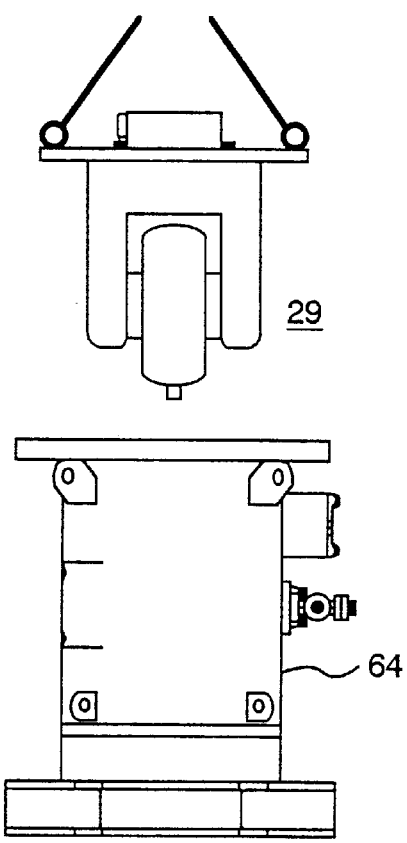
FIGS. 6a and 6b are views showing the assembling process of the potential transformer.
Figure 6B:
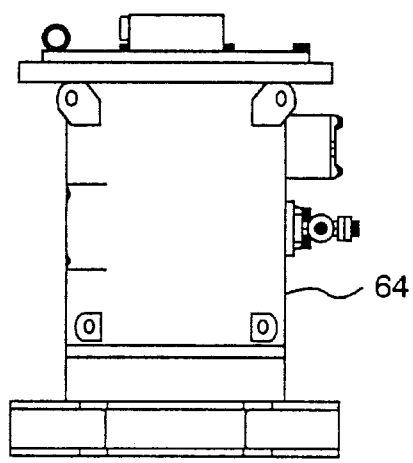

During the transportation, the potential transformer 29 is enclosed in a sealed transportation enclosure 64 as shown in FIGS. 6a, 6b. When assembling the line unit 3, the potential transformer 29 is taken out from the transportation enclosure 64 after assembling of the inner side of the line unit 3 as shown in FIG. 3, the potential transformer 29 is inserted into the line unit 3 through the hole 80 of the top plate 51 and an adapter cover or plate 56 is fixed to the top plate 51 by bolts 62. To make it easier to insert the potential transformer 29 into the line unit 3, the outboard width 1a of the potential transformer 29 is smaller than the inboard width 1b of the hole 80 of the top plate 51 as shown in FIG. 3. The adapter cover 56 is hermetically or air-tightly fixed to the top plate 51 with a seal 60.

Additionally, the outboard width 1c of the adapter cover 56 is larger than the inboard width 1b of the hole 80. Therefore, the adapter cover 56 is easily fixed on the outside of the top plate 51.

Figure 4:
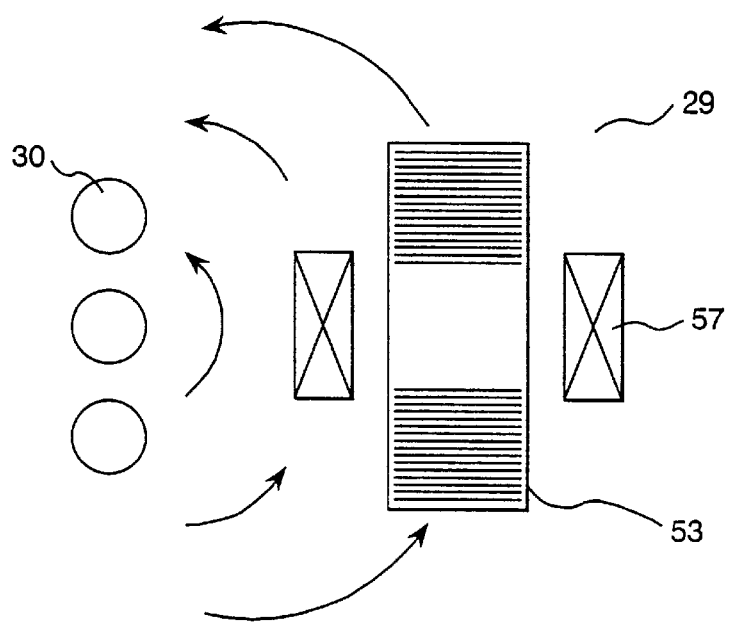
FIG. 4 is a cross sectional view along a line of III—III in Fig.3.

The relationship of the arrangement among the potential transformer 29, the conductor 26 and 31 are as follows. A core part 53 of the potential transformer 29 is a wound core type as shown in FIG. 4. The layer direction coincides with the arrangement direction of the conductor 26. On the other hand, the winding 68 is wound on the core 53 so as to be perpendicular to the layer direction of the core 53 A conductor 31 extends underside of the potential transformer 29.

By arranging the core part 53 of the potential transformer 29, the winding 68, and conductors 26,31 as mentioned above, and using the core of wound core type, the influence of the magnetic field induced by the main circuit current flowing through the conductors 26 and 31 is reduced.

Figure 5:
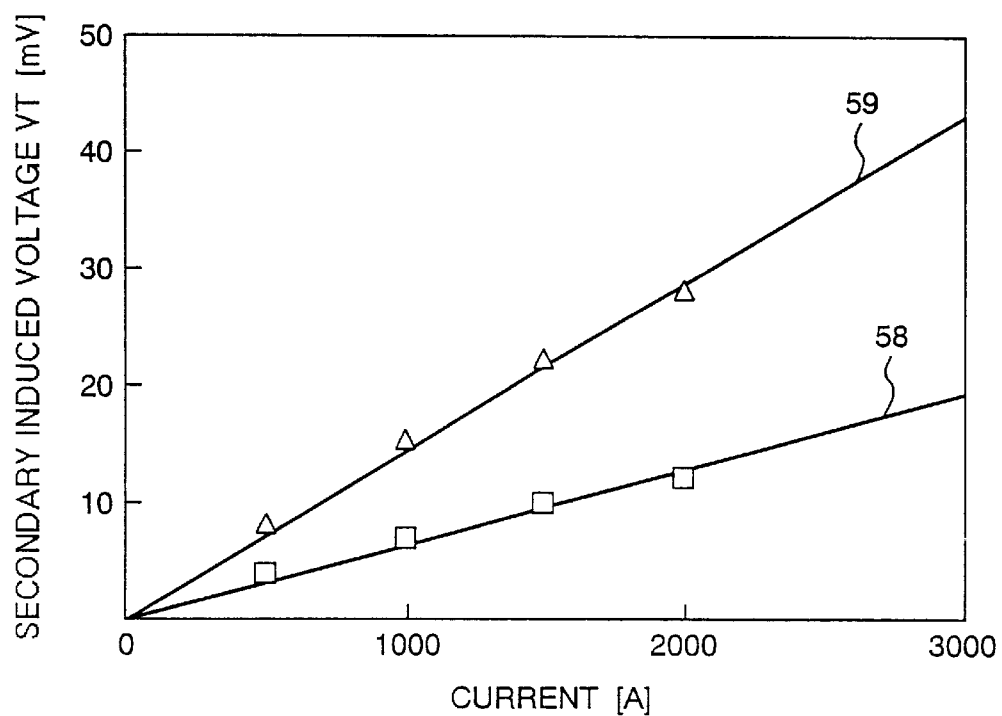
FIG. 5 is a graph showing the relationship between current and the secondary induced voltage.

As shown by line 59 in FIG. 5, in comparison with the case where the layer direction of the core is turned by 90 degrees, the secondary induced voltage of the potential transformer is able to be prevented below 13 mv and 19 mv at current of 2000A and 3000A respectively as shown by line 58. As a result, high accuracy current measurement is possible by using the potential transformer.

As described above, the present invention is able to reduce time necessary for assembling the potential transformer to the line unit. As a result, it is possible to prevent insulation performance from being reduced by the intrusion of water and dust into the line unit and therefore, to improve the reliability of the potential transformer.

In addition, the influence of the magnetic field induced by the current flow through the main circuit is reduced and therefore, high accuracy current detection of the potential transformer is realized.

What is claimed is:

1. A gas insulated switch gear comprising:
   a main bus unit;
   a circuit breaker unit hermetically coupled to said main bus unit;
   a line unit hermetically coupled to said circuit breaker unit and having a top plate with a hole therein for inserting a potential transformer;
   an adapter cover mounting the potential transformer inserted into said line unit through the hole, said adapter cover being connected hermetically to the top plate so as to cover the hole of the top plate.

2. A gas insulated switch gear according to claim 1, wherein the outer width of said adapter cover is larger than the width of the hole and the outboard width of the potential transformer is smaller than the width of the hole.

3. A gas insulated switch gear according to claim 1, wherein said adapter cover is hermetically connected to an outside surface of the top plate.

4. A gas insulated switch gear comprising:

a main bus unit;

a circuit breaker unit hermetically coupled to said main bus unit;

a line unit hermetically coupled to said circuit breaker unit and having a top plate with a hole therein for inserting a potential transformer;

an adapter cover mounting the potential transformer inserted into said line unit through the hole and being connected hermetically to an outside surface of the top plate, the outer width of said adapter cover being larger than the width of the hole, and the outer width of the potential transformer being smaller than the width of the hole.

5. A method of assembling a gas insulated switch gear comprising steps of:

hermetically connecting, a main bus unit, a circuit breaker unit and a line unit;

inserting a potential transformer mounted on an adapter cover into the line unit through a hole of a top plate of the line unit; and hermetically connecting the adapter plate to the top plate.

6. A gas insulated switch gear comprising:

a main bus unit;

a circuit breaker unit hermetically coupled to said main bus circuit; and a line unit hermetically coupled to said circuit unit, wherein an arrangement direction of a conductor for connecting a conductor joint mounted on an insulating support connected to said line unit with a cable sealing end disposed in the line unit coincides with a layer direction of a core of a potential transformer, and a winding of the potential transformer is wound so as to be perpendicular to the core layer direction of the transformer.

7. A gas insulated switch gear comprising:

a main bus unit;

a circuit breaker unit hermetically coupled to said main bus unit; and a line unit hermetically coupled to said circuit unit, wherein the layer direction of a core of a transformer in the line unit coincides with a direction of a magnetic field generated by a current flowing through a main circuit which connects a conductor joint mounted on an insulating support connected to said line unit with a cable sealing end disposed in the line unit, and wherein a winding of a potential transformer is wound so as to be perpendicular to a core layer direction of a transformer.

* * * * *